July 21, 1925.  1,546,828
H. J. DONNER
FARM GATE
Filed March 23, 1923    2 Sheets-Sheet 1
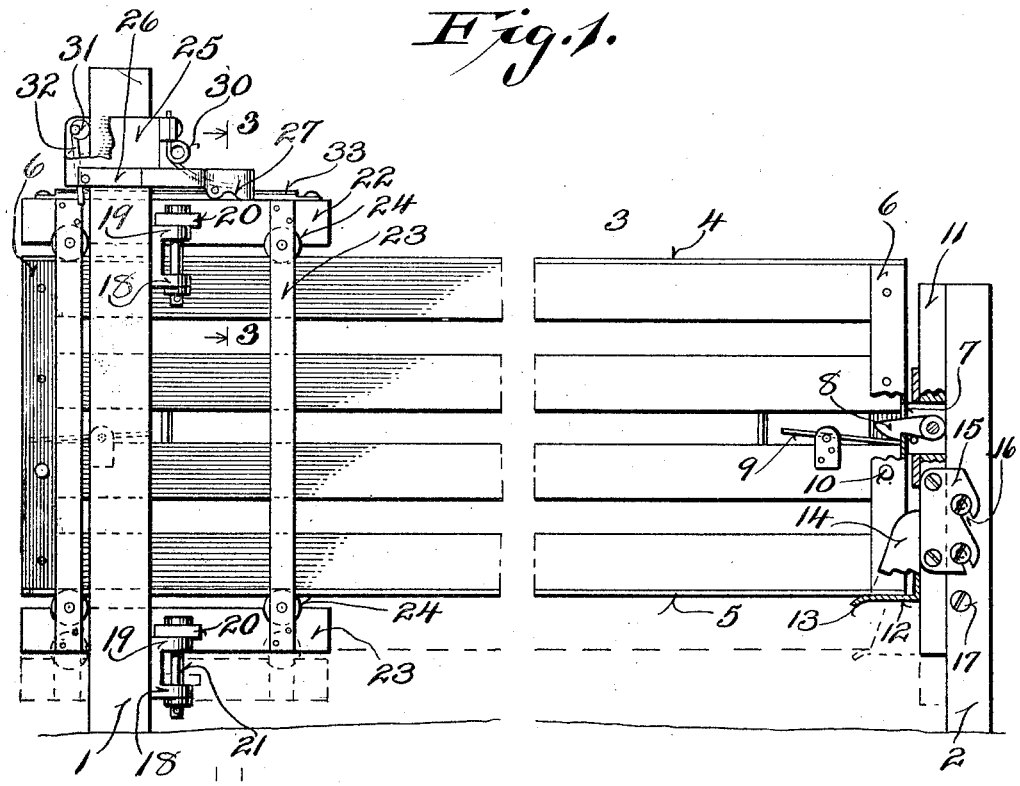
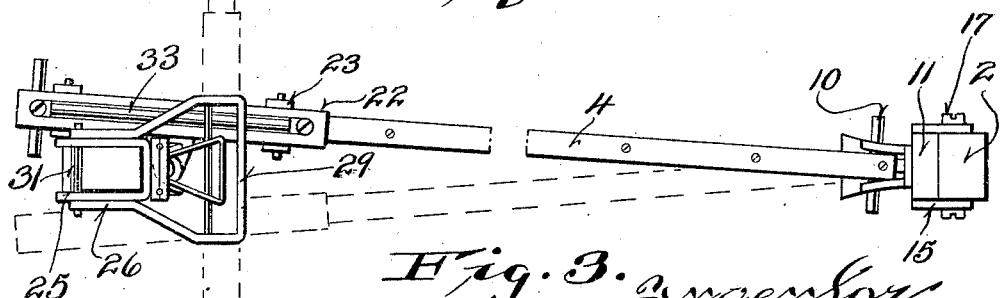
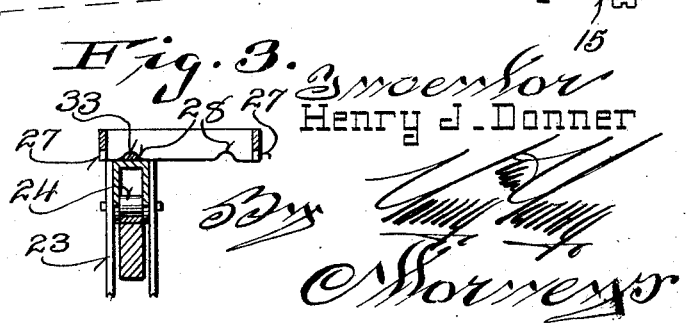
Inventor
Henry J. Donner July 21, 1925.

H. J. DONNER

FARM GATE

Filed March 23, 1923

Inventor
Henry J. Donner

Patented July 21, 1925.

1,546,828

UNITED STATES PATENT OFFICE.

HENRY J. DONNER, OF WATERTOWN, WISCONSIN.

FARM GATE.

Application filed March 23, 1923. Serial No. 627,004.

*To all whom it may concern:*

Be it known that I, HENRY J. DONNER, a citizen of the United States, and resident of Watertown, in the county of Jefferson and State of Wisconsin, have invented certain new and useful Improvements in Farm Gates; and I do hereby declare that the following is a full, clear, and exact description thereof.

This invention relates to gates and is particularly directed to a farm gate. Farm gates, as heretofore constructed, have not been wholly satisfactory, due to the fact that only a limited variation in the action of the gate was permitted, so that if the gate was of a swinging type, it could only be operated in this manner. Further difficulties have arisen, due to the sagging that occurs which displaces the free end of the gate and interferes with the smooth operation of the apparatus. Further difficulty has been encountered, particularly when there is a heavy snow fall, due to the fact that the gate, if properly positioned for normal conditions, will be incapable of operating until the snow has been cleared away.

It is to overcome these defects that this invention is designed and objects of the invention are, therefore, to provide a combined swinging and sliding gate, to provide a gate which may swing either way, and to provide a gate which may be slid part way and then swung to a position parallel to the road way.

Further objects are to provide an automatic dog to yieldingly hold the gate in any one of several positions, to provide a support for the free end of the gate to thereby relieve the gate of any tendency to sag when it is closed, and to provide a gate which is so constructed that both the removable portion and the stationary, or latching portion may be raised or lowered to adjust the gate to varying conditions.

An embodiment of the invention is shown in the accompanying drawings, in which:

Figure 1 is a side elevation of the gate in closed position.

Figure 2 is a plan view of the structure shown in Figure 1, showing in dotted lines two additional positions which the gate may take.

Figure 3 is a sectional view on the line 3—3 of Fig. 1.

Figures 4, 5:
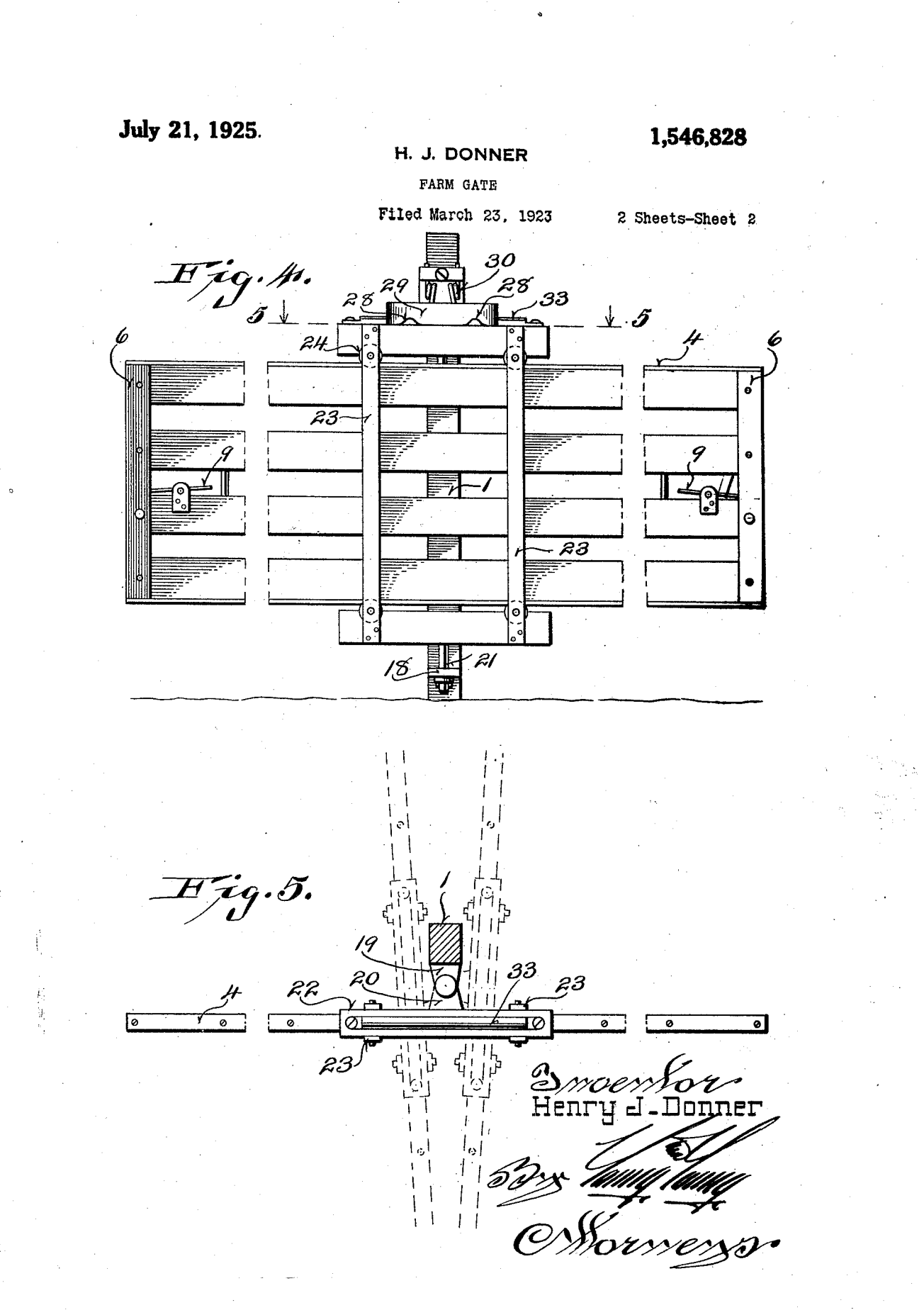

Figure 4 is an elevation of the gate, showing it slid half way and swung at right angles to its close position.

Figure 5 is a plan view of the gate shown in Figure 4, such view corresponding to a section on the line 5—5 of such figure, such view showing in dotted lines two other positions which may be taken by the gate.

Referring more particularly to the drawings, it will be seen that the gate comprises a support, or pivot post 1 and a latch post 2. Between these posts the gate proper, or gate body, indicated generally by the reference character 3, is normally positioned. This gate may comprise any desired structure, such as the slats indicated, suitably reinforced, or lattice work, or other design. It is provided with an upper and a lower metallic guiding strip indicated at 4 and 5 respectively. It is further provided with channel metallic end members 6, which form reinforcement for the terminals. These channel members are provided with apertures 7 through which the latch 8 may project. A trip lever 9 is pivotally mounted upon the gate body, as indicated at Figure 1 and is adapted to lift the latch 8 when the lever is operated and thereby release the gate. This construction is duplicated upon the opposite end of the gates, as may be seen in Figure 1. If desired, manipulating handles 10 may be provided at each end of the gate, so as to facilitate the sliding or swinging of the gate by the operator.

The latch 8 is carried in a channel shaped frame 11 which is adjustably mounted upon the latch post 2 and is provided adjacent its lower end with an outwardly projecting lip 12 terminating in a downwardly curved guiding extension 13. This support may have integrally formed therewith, side plates, or webs 14, which, as may be seen from Figure 2, are preferably divergent to aid in guiding the end of the gate to its proper place. The entire channel like member 11 is supported by means of clips 15 provided with upwardly slanting slots 16. These clips are positioned upon each side of the channel like member 11 and one or more pairs may be employed. A plurality of studs, or headed screws 17 are secured to the post 2 in spaced relation corresponding to the spacing of the slots 16. By means of this construction, the entire channel like portion 11 may be adjustably mounted and rigidly secured to the post 2 in any desired position, the position indicated in full lines in Figure 1 being that used when the roadway is encumbered by a heavy snow and the dotted line position being that occupied under normal conditions.

The pivot post 1 carries a plurality of outwardly projecting ears arranged in pairs, as indicated at 18 and 19. These ears are apertured and are adapted to cooperate with correspondingly positioned ears 20 secured to a gate supporting cradle hereinafter described. Pintle pins 21 are passed through the ears and pivotally join them. It is apparent from an inspection of Figure 1 that the ears 20 of the gate cradle may be positioned upon the uppermost of the stationary ears 19, as shown in full lines, to give the gate its highest position, or that such ears 20 may be positioned upon the lowermost ears 18 to correspondingly lower the gate and allow it to occupy the dotted line position. It is obvious that the two pintle pins illustrated in the drawings may be replaced by a single elongated pin, or rod, if desired.

The gate supporting cradle comprises an upper bar 22 and a lower bar 23, connected by any suitable frame work, such as the straps 23. A plurality of rollers 24 are revolubly mounted between the straps 23 and may be located within correspondingly recessed portions of the straps 22 and 23. These rollers are preferably flanged, as indicated in Figure 3, and cooperate with the strips 4 and 5 to afford a substantially frictionless support for the gate and to definitely guide such gate.

The upper portion of the pivot post 1 is provided with an adjustably positioned channel frame 25 which has pivotally joined thereto the two rearwardly extending arms 26 of a latching dog. This latching dog is provided with notches 27 upon its end face, such notches being in alignment transversely of the normal position of the gate. It is also provided with notches 28 in its transverse portion 29. A spring 30 is rigidly carried by the dog supporting frame 25 and urges the dog downwardly. A convenient means of temporarily locking the dog supporting frame 25 in its adjusted position is furnished by an eccentric 31 pivotally mounted in the frame 25 and provided with an operating lever 32. A metal rib 33 is secured to the upper face of the bar 22 of the cradle and has a rounded upper face adapted to cooperate with the notches 27 and 28 of the latching dog, as may be seen from Figure 3, to yieldingly hold the cradle in any one of several positions.

The operation of the gate is as follows:

After tripping the latch 8 as described, the gate may, if desired, be slid part way open, as indicated in dotted lines in Figure 5, if it is desired to only partially open the gate. If it is desired to completely open the gate without, however, sliding it its entire distance, it may be slid to the dotted line position shown in Figure 5 and rocked to the full line position in such figure, thereby affording complete opening for the gate. Also, it is quite clear that the gate may be positioned upon either side of the pivot post and may either be temporarily or permanently operated in such position. In any of the three positions, or variations thereof, as shown in Figure 5, the latching dog cooperates with the metallic rib 33 secured to the upper bar 22 and temporarily holds the gate in the selected position permitting, however, free sliding of the gate through the cradle.

It will be seen that a gate has been provided which is adapted to operate upon either side of the pivot post and which is adapted to swing in either direction. It will also be seen that the gate is adapted to be slid inwardly, as desired, with or without the swinging motion.

When the gate is used upon farms, it is extremely serviceable, as it permits the operator to occupy any desired position with reference to the cattle that he may be driving through the gate. For instance, he may swing the gate to the full line position indicated in Figure 4 and may stand adjacent one end of the gate and as the cattle finally pass through the gate, he may follow after them, carrying the end of the gate with him. Obviously, this process may be performed from either side of the gate.

It will be seen, therefore, that a combined sliding and swinging farm gate has been provided which may occupy any one of a number of different positions and which may be operated in widely different manners. It will also be seen that a farm gate has been provided in which the free end of the gate is normally supported and the gate is correspondingly relieved of forces tending to cause sagging.

It will further be seen that a combined swinging and sliding gate has been provided which may be adjusted to various heights to accommodate different conditions.

Although the invention has been described in considerable detail, it is to be understood that the invention may be widely varied and is to be limited only as claimed.

I claim:—

A gate comprising a pivot post, a cradle pivoted thereto, a gate body slidably carried by said cradle, a dog carried by said pivot post and cooperating with said cradle to yieldingly hold it in any one of a plurality of positions of adjustment, and means for temporarily holding said gate in closed position.

In testimony that I claim the foregoing I have hereunto set my hand at Watertown, in the county of Jefferson and State of Wisconsin.

HENRY J. DONNER.